United States Patent [19]
Saito et al.

[11] Patent Number: 4,858,924
[45] Date of Patent: Aug. 22, 1989

[54] SOLID GOLF BALL

[75] Inventors: Tasuku Saito, Tokorozawa; Shinichi Kakiuchi, Kodaira, both of Japan

[73] Assignee: Bridgestone Corporation, Tokyo, Japan

[21] Appl. No.: 167,259

[22] Filed: Mar. 11, 1988

Related U.S. Application Data

[63] Continuation-in-part of Ser. No. 858,215, May 1, 1986, abandoned.

[30] Foreign Application Priority Data

May 1, 1985 [JP] Japan .................................. 60-94186

[51] Int. Cl.$^4$ ............................................. A63B 37/00
[52] U.S. Cl. ..................................... 273/62; 273/218; 273/220; 273/230; 273/235 R; 273/DIG. 22
[58] Field of Search .................... 273/218, 220, 235 R, 273/230, 62, DIG. 22

[56] References Cited

U.S. PATENT DOCUMENTS

| | | | |
|---|---|---|---|
| 4,141,559 | 2/1979 | Melvin et al. | 273/220 |
| 4,274,637 | 6/1981 | Molitor | 273/235 R |
| 4,431,193 | 2/1984 | Nesbitt | 273/218 |
| 4,546,980 | 10/1985 | Gendreau | 273/220 |
| 4,570,937 | 2/1986 | Yamada | 273/220 |

FOREIGN PATENT DOCUMENTS

| | | | |
|---|---|---|---|
| 2053256 | 2/1981 | United Kingdom | 273/218 |
| 2064339 | 6/1981 | United Kingdom | 273/235 R |
| 2139101 | 11/1984 | United Kingdom | 273/220 |

Primary Examiner—George J. Marlo
Attorney, Agent, or Firm—Birch, Stewart, Kolasch & Birch

[57] ABSTRACT

Solid golf balls comprising a solid core and a cover which exhibit improved flying performance, controllability, repulsion, fatigue resistance, and hitting feel. The solid core is formed from a composition comprising a polybutadiene containing at least 40% of cis-1,4-bond and an unsaturated carboxylic acid and/or a metal salt thereof for causing crosslinking of the polybutadiene and having a deformation of 1.5 to 3.5 mm under a constant load of 100 kg, and the difference in hardness between the center and the periphery of said solid core is less than 10%; and the cover is formed from a thermoplastic resin composition comprising 97 to 65% by weight of an ionomer resin and 3 to 35% by weight of a flexible resin selected from the group consisting of polyester elastomers, polyamide propylene-butadiene copolymers, 1,2 polybutadienes, polybutiene-1, and sytrene-butadiene block copolymers and mixtures thereof, and having a resilience of at least 35%, and having a flexural modulus of 1,500 to 4,500 kg/cm$^2$ and a thickness of 0.3 to 1.8 mm.

1 Claim, 1 Drawing Sheet

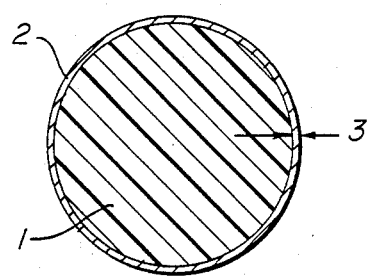
F I G. 1
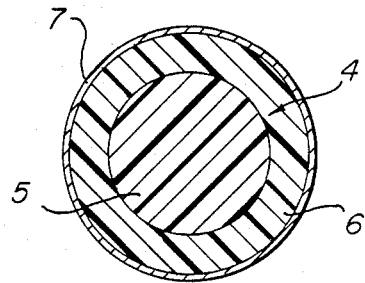
F I G. 2

SOLID GOLF BALL

This application is a continuation-in-part application of Ser. No. 858,215 filed on May 1, 1986, now abandoned, which is hereby incorporated by reference.

This invention relates to solid golf balls typically known as two-piece golf balls comprising a solid core and a thermoplastic resin cover. More particularly, it relates to such solid golf balls having improved flying performance, controllability, hitting feel, and durability.

BACKGROUND OF THE INVENTION

Well known in the art are solid golf balls, for example, two-piece golf balls which are generally formed by milling polybutadiene rubber, methacrylic acid or another unsaturated carboxylic acid or a salt thereof, zinc oxide, peroxide and any desired additives together to form a rubber composition, thermoforming the composition into a solid core, and covering the core with a cover of a thermoplastic resin. In these solid golf balls, for example, two-piece golf balls, hard ionomer resins having excellent cut resistance are generally used as the thermoplastic resin to form the cover. The solid golf balls having a cover formed of such an ionomer resin exhibit improved durability and flying performance. In order to impart further improved repulsion or initial speed upon impact to the solid golf balls, it is proposed to control the cover of the ionomer resin to a thickness of about 22.1 to about 2.5 mm. See Japanese Patent Application Laid-Open Nos. 59-37961 and 59-49780.

As compared with conventional thread-wound balls, these solid golf balls, however, show markedly inferior controllability and unpleasant feel when they are hit with a middle or short iron requiring accurate control as well as flying performance. For this reason, few professional golfers use solid golf balls in current games.

Some attempts were made in the past to render the hitting feel of solid golf balls soft by reducing the hardness of the solid core or by molding the cover from a softer material. These attempts failed to produce satisfactory balls because flying performance and durability were more or less deteriorated.

On the contrary, wound golf balls are currently used by most professional golfers in games because the wound golf balls are superior in flying performance and controllability. However, the wound golf balls have poor durability including cut resistance and fatigue endurance. Further, most ordinary players fail to make the best use of the wound golf balls to fully enjoy the superior flying performance thereof, resulting in a rather short flying distance. Thus most ordinary players like solid golf balls such as two-piece golf balls which exert the excellent flying performance even when hit with ordinary skill. For the purpose of improving the flying performance of wound golf balls, it was proposed to use a lightweight center having a relatively large diameter and coat the center with a high specific gravity cover to produce a ball having increased inertia moment (see Japanese Patent Application Laid-Open No. 59-129072). However, such attempts have been unsuccessful in improving the flying performance and durability to an extent comparable to solid golf balls as exemplified by two-piece golf balls.

Therefore, there is the need for golf balls which can fly a long distance comparable to solid golf balls and exhibit excellent controllability comparable to wound golf balls, as well as pleasant hitting feel and high durability.

SUMMARY OF THE INVENTION

It is, therefore, an object of the present invention to provide an improved solid golf ball which exhibits flying performance comparable to the conventional solid golf balls when hit with clubs requiring a long flying distance, such as drivers, and spin properties and controllability comparable to the wound golf balls when hit with clubs requiring controlled distance and accuracy as well as a flying distance, such as middle and short irons, offers a pleasant feel upon hitting, and has improved durability including fatigue endurance and cut resistance.

We have prepared a series of core-cover golf balls with the varying physical properties of the solid core and the varying physical properties and thickness of the cover, and measured various properties of the balls by hitting them with various golf clubs including woods, irons, and putters. The relationship of the loft angle of a club to the spin properties of a ball has also been examined to improve ball controllability.

With respect to a solid golf ball comprising a solid core and a cover, we have found that the above object is attained when the solid core is formed from a composition comprising a polybutadiene containing at least 40% of a cis-1,4-bond and an unsaturated carboxylic acid and/or a metal salt thereof for causing crosslinking of the polybutadiene and having a deformation of 1.5 to 3.5 mm under a constant load of 100 kg, and the cover is formed from a thermoplastic resin composition and has a flexural modulus of 1,500 to 4,500 kg/cm$^2$ and a thickness of 0.3 to 1.8 mm.

The solid golf ball of this invention exhibits flying performance at least comparable to the conventional solid golf balls when hit with clubs requiring a long flying distance such as woods and spin properties comparable to the wound golf balls when hit with clubs requiring controllability such as middle and short irons, promises an increased flying distance due to improved repulsion and high controllability due to improved spinning properties, offers a pleasant feel upon hitting, and has improved durability including fatigue endurance and cut resistance.

The present invention is completed on the basis of our discovery that the aforementioned appropriate combination of solid core and cover materials can provide solid golf balls with improved flying performance, controllability, hitting feel, and durability.

The above and other objects, features, and advantages of the invention will be more apparent from the following description.

DESCRIPTION OF THE DRAWINGS

FIG. 1 is a cross-sectional view of a two-piece golf ball having a solid core 1 and a cover 2. The thickness of the cover 3 is from 0.3 to 1.8 mm.

FIG. 2 is a cross-sectional view of a golf ball having a core 4 made of a center core 5, an outer core 6, and a cover 7.

DETAILED DESCRIPTION OF THE INVENTION

The solid golf ball of the present invention includes a solid core and a cover. According to the feature of the present invention, the solid core is formed from a composition comprising a polybutadiene containing at least 40% of a cis-1,4-bond, preferably at least 60% of a cis-1,4-bond, and most preferably at least 85% of a cis-1,4-bond and an unsaturated carboxylic acid and/or a metal salt thereof for crosslinking the polybutadiene, and having a deformation of 1.5 to 3.5 mm, preferably 1.8 to 3.2 mm under a constant load of 100 kg. The term deformation under a constant load of 100 kg designates the distance of deformation of a spherical solid core occurring when a load of 100 kg is applied to the core.

The solid core composition may optionally contain an additional rubber component such as styrene-butadiene rubbers, natural rubbers, and isoprene rubbers. Preferably, the polybutadiene rubber occupies at least 50% by weight, more preferably at least 70% by weight of the combined rubber components.

The unsaturated carboxylic acids and their metal salts for causing crosslinking of the polybutadiene rubber include acrylic acid, methacrylic acid, and divalent metal salts thereof such as the zinc salts of acrylic acid and methacrylic acid. They may be used alone or in admixture of two or more. The amount of the unsaturated carboxylic acids and metal salts used preferably ranges from 10 to 60 parts by weight per 100 parts by weight of the polybutadiene.

The solid core composition may further oontain fillers such as zinc oxide, barium sulfate, calcium carbonate, silica, etc., crosslinking agents such as organic peroxides, and any desired additives commonly used in forming the solid core. The amount of these additives may be readily determined by those skilled in the art.

Some preferred examples of the solid core composition are compositions containing 100 parts by weight of a polybutadiene having a cis-1,4-bond, 10 to 30 parts by weight of acrylic and/or methacrylic acid, 10 to 70 parts by weight of zinc oxide, and 0.5 to 6 parts by weight of a peroxide wherein the compositions are cured by heating; and compositions containing 100 parts by weight of a polybutadiene having a cis-1,4-bond, 20 to 60 parts by weight of a metal salt of an unsaturated carboxylic acid such as zinc acrylate and zinc methacrylate, 10 to 50 parts by weight of a filler or weight regulating agent such as zinc oxide, and 0.1 to 5 parts by weight of a peroxide wherein the compositions are cured by heating.

The solid cores formed from the above-mentioned compositions are required to exhibit a deformation of 1.5 to 3.5 mm, preferably 1.8 to 3.2 mm under 100-kg constant load in order to produce solid golf balls having improved properties. Cores exhibiting a deformation of less than 1.5 mm are too hard to offer a pleasant hitting feel whereas cores exhibiting a deformation of more than 3.5 mm are too soft and thus less repulsive and durable.

The solid core may preferably have a narrow distribution of hardness particularly when two-piece balls are produced. The difference in hardness between the center and the periphery of the solid core is preferably 10% or less, more preferably 5% or less. The difference in hardness between the center and the periphery of the solid core is defined as $$\frac{A - B}{A} \times 100 \, (\%)$$

wherein "A" is the hardness of the periphery of the solid core and "B" is the hardness of the center of the solid core. Hardness is measured using a JIS (Japanese Industrial Standard) A hardness tester.

The solid core used in the practice of the present invention may be either a solid core which may be covered with a cover into a two-piece golf ball or a solid core of multilayer structure consisting of a center core and one or more outer cores which are changed in hardness and/or density by a proper choice of the composition. The multilayer structure solid core may also be covered with a cover into a multilayer golf ball such as a three-piece golf ball. The respective layers, that is, center core and outer core(s) of the multilayer structure solid core are all formed from the present compositions comprising a polybutadiene containing at least 40% of a cis-1,4-bond and an unsaturated carboxylic acid and/or a metal salt thereof for causing crosslinking of said polybutadiene and having a deformation of 1.5 to 3.5 mm under a constant load of 100 kg. Preferably the hardness distribution of the core is narrow such that the hardness difference between the respective layers may fall within 10%.

The solid cores generally have a diameter of 37.0 to 40.8 mm and a weight of 34.5 to 43.5 grams for the small-size golf balls and a diameter of 38.0 to 42.4 mm and a weight of 34.5 to 43.0 grams for the large-size golf balls.

The above-mentioned solid cores are covered with covers composed of a thermoplastic resin composition and having a flexural modulus of 1,500 to 4,500 kg/cm$^2$ and a thickness of 0.3 to 1.8 mm, thereby producing solid golf balls having improved flying performance, controllability, hitting feel, and durability.

The flexural modulus used herein is measured according to ASTM D 790 Method I - Procedure B as described in the Annual Book of ASTM Standards, Vol. 08.01 (1986) which is hereby incorporated by reference. The covers used in the practice of the present invention should have a flexural modulus of 1,500 to 4,500 kg/cm$^2$, preferably 1,800 to 4,000 kg/cm$^2$. Covers having a flexural modulus of lower than 1,500 kg/cm$^2$ fail to render the balls fully repulsive. If the flexural modulus of the cover exceeds 4,500 kg/cm$^2$, the resultant balls become less controllable upon hitting with such clubs as irons, unpleasant to the feel upon hitting, and less durable.

Preferably, the covers used in the practice of the present invention have a resilience of at least 35%, more preferably at least 40% as measured by means of a Dunlop tripsometer. The resulting balls exhibit excellent repulsion.

The covers are formed from thermoplastic resin compositions in the practice of the present invention. The compositions are based on a thermoplastic resin having a flexural modulus of 1,500 to 5,000 kg/cm$^2$ and preferably exhibiting a resilience of at least 35%, especially at least 40% and a melt index MI of at least 0.1 gram, especially at least 0.3 grams as measured according to ASTM D 1238-52T, ASTM Standard 1952, Part 6, pg. 736 which is hereby incorporated by reference. Some preferred examples of the thermoplastic resins include ionomer resins, polyester elastomers, polyamide elastomers, thermoplastic urethane elastomers, propylene-butadiene copolymers, 1,2-polybutadiene, and styrene-butadiene copolymers alone or in admixture, with the ionomer resins being most preferred.

The preferred ionomer resins are polymers formed by polymerizing a monoolefin with one or more members selected from the group consisting of unsaturated mono- and dicarboxylic acids having 3 to 8 carbon atoms and esters thereof and adding a crosslinking metal linkage thereto.

The covers used in the practice of the present invention may be formed from the aforementioned thermoplastic resin alone although it is preferred for the purpose of increasing the durability of balls to blend a thermoplastic resin having a flexural modulus of 1,500 to 5,000 kg/cm$^2$ and preferably a resilience of at least 35% as mentioned above with another flexible resin.

The flexible resin preferably has a proper degree of compatibility with the thermoplastic resin having a flexural modulus of 1,500 to 5,000 kg/cm$^2$. Differently stated, the flexible resin forms a microscopically discrete phase in the thermoplastic resin or matrix when blended therewith, that is, it forms islands in a so-called sea-island structure while the discrete phase may be substantially uniformly dispersed by ordinary blending means. Most preferred flexible resins are those resins not only having such a proper degree of compatibility with the thermoplastic resin matrix, but also exhibiting a stress of up to 100 kg/cm$^2$, especially up to 80 kg/cm$^2$ at 10% elongation, a resilience of at least 35%, especially at least 40%, and a melt index MI of at least 0.1 gram, especially at least 0.3 grams.

Some preferred examples of the flexible resins meeting the aforementioned purpose include polyester elastomers, polyamide elastomers, thermoplastic urethane elastomers, propylene-butadiene copolymers, 1,2-polybutadiene, polybutene-1, and styrene-butadiene block copolymers alone or in admixture of two or more.

Exemplary of the polyester elastomers there may be given polyether ester block copolymers, polylactone ester block copolymers, aliphatic and aromatic dicarboxylic acid copolymerized polyesters, and the like. The polyether ester block copolymers used herein are copolymers comprising polyester hard segments polymerized from a dicarboxylic acid and a low molecular weight diol and polyether soft segments polymerized from an alkylene glycol having 2 to 10 carbon atoms. Better mechanical properties including rupture strength and resilience are obtained when the dicarboxylic acid component contains more than about 40 mol % of an aromatic dicarboxylic acid such as terephthalic acid. The preferred low molecular weight diol components are aliphatic and alicyclic diols having 2 to 10 carbon atoms alone or in admixture. The polylactone ester block copolymers are obtained by substituting polylactone chains for the polyether as the soft segments in the above-mentioned polyether ester block copolymers. The aliphatic and aromatic dicarboxylic acid copolymerized polyesters are generally copolymers of an acid component selected from aromatic dicarboxylic acids such as terephthalic acid and isophthalic acid and aliphatic dicarboxylic acids having 2 to 10 carbon atoms with at least one diol component selected from aliphatic and alicyclic diols having 2 to 10 carbon atoms although blends of an aromatic polyester and an aliphatic polyester may be equally used in the practice of the present invention.

The matrix resin and the flexible resin are preferably blended such that the blend contains 97 to 65% by weight, especially 95 to 75% by weight of the matrix resin and 3 to 35% by weight, especially 5 to 25% by weight of the flexible resin. Blends containing less than 3% by weight of the flexible resin do not always show a sufficient fatigue failure improvement whereas more than 35% by weight of the flexible resin will sometimes result in poor cut resistance.

By admixing the flexible resin in the matrix resin, fatigue failure resistance is significantly improved to a sufficient extent to ensure the production of solid golf balls wherein the cover is formed to the reduced thickness of 0.3 to 1.8 mm which could otherwise be achieved at the sacrifice of fatigue failure in the prior art.

When the matrix resin is blended with the flexible resin to prepare the cover-forming composition in the practice of the present invention, blending may be carried out by conventional polymer blend techniques.

The cover-forming composition may optionally contain well-known additives, for example, coloring agents and fillers.

The covers used in the practice of the present invention have a thickness ranging from 0.3 to 1.8 mm, preferably from 0.5 to less than 1.6 mm. Covers having a thickness of less than 0.3 mm fail to provide sufficient fatigue failure resistance and are difficult to form. Covers thicker than 1.8 mm improve repulsion and spin properties to a lesser extent.

In the practice of the present invention, the solid cores may be molded by any conventional techniques, for example, by milling the ingredients of the solid core composition mentioned above in a conventional mill such as a Banbury mixer and roll mill, compression or injection molding the composition in a core-forming mold, and heating the molded core. Multilayered cores may also be molded by a similar, but slightly modified technique. The heating temperature may be 120° to 180° C. when the core composition contains dicumyl peroxide as the peroxide curing agent. Also, the method of covering the solid core with the cover is not particularly limited. One method is by placing the solid core in a pair of cover halves preformed in semispherical shape and thermoforming them into an integral ball. Alternatively, the cover composition may be injection molded over the solid core to form a core-cover integrated ball.

As mentioned above, the solid golf ball according to the present invention comprising a solid core and a cover wherein the solid core is formed from a composition comprising a polybutadiene containing at least 40% of a cis-1,4-bond and an unsaturated carboxylic acid and/or a metal salt thereof for causing crosslinking of the polybutadiene and having a deformation of 1.5 to 3.5 mm under a constant load of 100 kg, and the cover is formed from a thermoplastic resin composition and has a flexural modulus of 1,500 to 4,500 kg/cm$^2$ and a thickness of 0.3 to 1.8 mm exhibits improved flying performance, controllability, and repulsion (initial speed), and is durable and soft to the feel upon hitting.

In order that those skilled in the art will better understand the practice of the present invention, examples are presented below by way of illustration and not by way of limitation. Comparative examples are also given along with the examples.

EXAMPLES & COMPARATIVE EXAMPLES

Solid cores of the size required for the large golf ball were prepared by combining polybutadiene, zinc acrylate, zinc oxide, and dicumyl peroxide according to the formulation shown in Table 1, milling the core compositions in a Banbury mixer and a roll mill, and compression molding them at 150° C. for 40 minutes.

Cover compositions as shown in Table 1 were injection molded over the solid cores to form two-piece golf balls of the large size, which were found to have physical properties as shown in Table 1.

These golf balls were evaluated for various properties by the following test procedures. For comparison purposes, a commercially available Surlyn covered wound golf ball (diameter 42.8 mm, cover thickness 2.0 mm; manufactured by Bridgestone Corporation) as Comparative Example 2 and a commercially available balata covered wound golf ball (diameter 42.75 mm, cover thickness 1.80 mm; manufactured by Bridgestone Corporation) as Comparative Example 3 were also evaluated. The results are shown in Table 1.

Golf Ball Performance Evaluation

Initial speed and spin

A ball is hit with a T/T machine (a swing robot manufactured by True Temper Co.) and photographic measurement is made. The initial speed is measured by striking with a driver and the spin is measured by striking with a driver and a 7th iron.

Cut resistance

A ball is hit with a seventh iron under a pressure of 7 kg/cm² using a swing machine. The surface of the ball was visually observed for flaw marks.

Fatigue endurance

Using a throwing machine, a ball is thrown at an initial speed of 70 m/sec. against a rubber wall spaced 1.5 m from the machine. Throwing operations repeated until failure are counted.

The properties of cut resistance and fatigue endurance are expressed in relative value provided that the ball of Comparative Example 1 has a value of 100.

Controllability and feel

Fifteen professional golfers hit balls to evaluate these properties. The controllability is that of a ball when hit with an iron.

Evaluation is made in three ranks. For controllability, E is excellent, G is good, and B is bad. For feel, E is excellent, G is good, and B is bad, that is, hard.

TABLE 1

| | Examples (Golf Ball of the Invention) | | | | | | | Comparative Examples | | |
|---|---|---|---|---|---|---|---|---|---|---|
| | 1 | 2 | 3 | 4 | 5 | 6 | 7 | 1 | 2 | 3 |
| | | | | | | | | Golf Ball Outside Scope of Invention | Prior Art | Prior Art |
| Solid core | | | | | | | | | Golf Ball (Surlyn Covered Wound Golf Ball) | Golf Ball (Balata Covered Wound Golf Ball) |
| Composition, parts by weight | | | | | | | | | | |
| Cis-1,4-polybutadiene | 100 | 100 | 100 | 100 | 100 | 100 | 100 | 100 | | |
| Zinc acrylate | 35 | 35 | 35 | 35 | 35 | 35 | 35 | 33 | | |
| Zinc oxide | 2.5 | 6 | 14 | 2.5 | 14 | 14 | 5 | 17 | | |
| Dicumyl peroxide | 1.0 | 1.0 | 1.0 | 1.0 | 1.0 | 1.0 | 1.0 | 1.0 | | |
| Diameter, mm | 42.0 | 41.4 | 39.7 | 42.0 | 40.0 | 39.8 | 39.8 | 38.3 | | |
| Deformation, mm*[1] | 2.3 | 2.3 | 2.6 | 3.0 | 3.0 | 2.3 | 2.3 | 2.7 | | |
| Center/periphery hardness difference | 2.2 | 2.4 | 2.2 | 2.3 | 2.4 | 2.2 | 2.2 | 2.3 | | |
| Cover | | | | | | | | | | |
| Composition, parts by weight | | | | | | | | | | |
| Ionomer resin | 90 | 95 | 85 | 90 | 90 | 100 | — | 100 | | |
| Polyester elastomer*[2] | 10 | 5 | 15 | 10 | 10 | — | 100 | — | | |
| Titanium dioxide | 2 | 2 | 2 | 2 | 2 | 2 | 2 | 2 | | |
| Properties of ionomer | | | | | | | | | | |
| Flexural modulus, kg/cm² | 3750 | 3750 | 4000 | 2200 | 2200 | 2200 | — | 3750 | | |
| Resilience, % | 53 | 53 | 54 | 51 | 51 | 51 | — | 53 | | |
| Properties of elastomer | | | | | | | | | | |
| M10*[3], kg/cm² | 30 | 30 | 30 | 40 | 68 | — | 140 | — | | |
| Resilience, % | 65 | 65 | 65 | 60 | 55 | — | 55 | — | | |
| Thickness, mm | 0.5 | 0.7 | 1.5 | 0.5 | 1.4 | 1.5 | 1.5 | 2.2 | | |
| Flexural modulus, kg/cm² | 3600 | 3650 | 3500 | 2000 | 2100 | 2200 | 2150 | 3750 | | |
| Ball properties | | | | | | | | | | |
| Deformation*[1], mm | 2.3 | 2.2 | 2.4 | 2.9 | 2.8 | 2.1 | 2.2 | 2.3 | 2.5 | 2.3 |
| Weight, g | 45.3 | 45.4 | 45.5 | 45.3 | 45.6 | 45.4 | 45.7 | 45.5 | 45.6 | 45.6 |
| Initial speed, m/sec. | 65.5 | 65.4 | 65.5 | 65.3 | 65.1 | 65.2 | 65.3 | 64.7 | 64.6 | 64.8 |
| Spin with driver, rpm | 3800 | 3700 | 3600 | 3900 | 3750 | 3650 | 3700 | 3500 | 4500 | 4900 |
| 7th iron, rpm | 7800 | 7200 | 6300 | 7900 | 6500 | 6400 | 6500 | 4900 | 7500 | 8100 |
| Fatigue endurance, index | 95 | 105 | 150 | 85 | 140 | 85 | 90 | 100 | 45 | 60 |
| Cut resistance, index | 90 | 95 | 100 | 90 | 100 | 100 | 95 | 100 | 75 | 35 |
| Controllability | E | E | G | E | G | G | G | B | E | E |
| Feel | G | G | G | G | G | G | G | B | G | E |

*[1]deformation expressed in mm under a constant load of 100 kg.
*[2]polyester elastomer consisting of terephthalic acid, isophthalic acid, 1,4-butanediol, and polytetramethyleneoxide glycol.
*[3]M10: stress at 10% elongation.

As seen from the data in Table 1, the solid golf balls of the present invention exhibit excellent flying performance, spin properties, controllability, improved repulsion and fatigue endurance, and good feel.

We claim:

1. In a solid golf ball comprising a solid core and a cover,
the improvement wherein said solid core is formed from a composition comprising a polybutadiene containing at least 40% of a cis-1,4-bond and an unsaturated carboxylic acid and/or a metal salt thereof for causing crosslinking of said polybutadiene and having a deformation of 1.5 to 3.5 mm under a constant load of 100 kg, and the difference in hardness between the center and the periphery of said solid core is less than 10%; and
said cover is formed from a thermoplastic resin composition comprising 97 to 65% by weight of an ionomer resin and 3 to 35% by weight of a flexible resin selected from the group consisting of polyester elastomers, polyamide elastomers, thermoplastic urethane elastomers, propylene-butadiene copolymers, 1,2-polybutadienes, polybutene-1 and styrene-butadiene block copolymers and mixtures thereof and having a resilience of at least 35%, and having a flexural modulus of 1,500 to 4,500 kg/cm² and a thickness of 0.3 to 1.8 mm.

* * * * *